(12) United States Patent
Jung et al.

(10) Patent No.: US 12,438,179 B2
(45) Date of Patent: Oct. 7, 2025

(54) CELL PREPARATION APPARATUS AND METHOD

(71) Applicant: LG Energy Solution, Ltd., Seoul (KR)

(72) Inventors: Tai Jin Jung, Daejeon (KR); Su Taek Jung, Daejeon (KR); Soon Kwan Kwon, Daejeon (KR); Sang Ho Bae, Daejeon (KR); Seong Won Choi, Daejeon (KR); Yong Jun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 378 days.

(21) Appl. No.: 17/912,324

(22) PCT Filed: Mar. 25, 2021

(86) PCT No.: PCT/KR2021/003730
§ 371 (c)(1),
(2) Date: Sep. 16, 2022

(87) PCT Pub. No.: WO2021/194285
PCT Pub. Date: Sep. 30, 2021

(65) Prior Publication Data
US 2023/0142362 A1    May 11, 2023

(30) Foreign Application Priority Data
Mar. 25, 2020 (KR) .......................... 10-2020-0036394

(51) Int. Cl.
*H01M 10/04* (2006.01)
*B65H 35/00* (2006.01)

(52) U.S. Cl.
CPC .... *H01M 10/0404* (2013.01); *B65H 35/0006* (2013.01)

(58) Field of Classification Search
CPC ..................... H01M 10/0404; H01M 10/0459
See application file for complete search history.

(56) References Cited

U.S. PATENT DOCUMENTS

2004/0154160 A1 * 8/2004 Hong ................ H01M 10/0583
29/730
2010/0132308 A1    6/2010 Kadowaki et al.
(Continued)

FOREIGN PATENT DOCUMENTS

CN        1301563 C  *  2/2007
CN      101663780 A     3/2010
(Continued)

OTHER PUBLICATIONS

CN1301563C translation (Year: 2005).*
(Continued)

*Primary Examiner* — Allison Bourke
*Assistant Examiner* — Travis L. Martin
(74) *Attorney, Agent, or Firm* — Lerner David LLP

(57) ABSTRACT

An apparatus for preparing a cell is provided. The apparatus includes an electrode reel from which an electrode sheet is unwound, wherein the electrode sheet is configured to form a plurality of electrodes, a separator reel from which a separator sheet is unwound, wherein the separator sheet is configured to stack with the electrode while covering the electrode by being folded when the electrode is stably placed, a table having an upper surface on which the electrode and the separator sheet are stably placed, and a nozzle configured to apply an adhesive to at least a portion of a region of the separator sheet stably placed on the table.

12 Claims, 13 Drawing Sheets

(56) References Cited

U.S. PATENT DOCUMENTS

| | | |
|---|---|---|
| 2011/0104567 A1 | 5/2011 | Lee |
| 2014/0237808 A1 | 8/2014 | Nakakuki et al. |
| 2015/0044555 A1 | 2/2015 | Lee |
| 2018/0159104 A1 | 6/2018 | Lee et al. |
| 2018/0323415 A1 | 11/2018 | Lee et al. |
| 2019/0363389 A1 | 11/2019 | Ko et al. |
| 2020/0075909 A1 | 3/2020 | Lee et al. |
| 2020/0136190 A1 | 4/2020 | Yamashita et al. |
| 2020/0235434 A1 | 7/2020 | Lee et al. |

FOREIGN PATENT DOCUMENTS

| | | | | |
|---|---|---|---|---|
| CN | 102055004 A | | 5/2011 | |
| CN | 106450409 A | * | 2/2017 | ........ H01M 10/0404 |
| CN | 109378530 A | | 2/2019 | |
| CN | 110050374 A | | 7/2019 | |
| JP | 2012160352 A | | 8/2012 | |
| JP | 2017016946 A | | 1/2017 | |
| JP | WO2018154777 A1 | | 7/2019 | |
| JP | 6632823 B2 | | 1/2020 | |
| KR | 20100016619 A | | 2/2010 | |
| KR | 20110048839 A | | 5/2011 | |
| KR | 20120069901 A | | 6/2012 | |
| KR | 20120078824 A | | 7/2012 | |
| KR | 101235355 B1 | | 2/2013 | |
| KR | 101655507 B1 | | 9/2016 | |
| KR | 101950448 B1 | | 2/2019 | |
| KR | 101977639 B1 | | 5/2019 | |
| KR | 20190045602 A | | 5/2019 | |
| KR | 20190097666 A | | 8/2019 | |
| KR | 102049509 B1 | * | 11/2019 | |
| KR | 2020-0023852 A | | 3/2020 | |
| KR | 20200023854 A | | 3/2020 | |
| WO | WO-2020050537 A1 | * | 3/2020 | ........ H01M 10/0404 |

OTHER PUBLICATIONS

"Safeguarding Equipment and Protecting Employees from Amputations", OSHA 3170-02R 2007 (Year: 2007).*
CN106450409A translation (Year: 2017).*
WO2020050537A1 translation (Year: 2020).*
KR102049509B1 translation (Year: 2019).*
Extended European Search Report including Written Opinion for Application No. 21775930. 7 dated Jul. 1, 2024. 10 pgs.
International Search Report for Application No. PCT/KR2021/003730 mailed Jul. 16, 2021, 2 pages.
Search Report dated Nov. 26, 2024 from the Office Action for Chinese Application No. 202180019947.5 Issued Nov. 29, 2024, pp. 1-3.

* cited by examiner

CELL PREPARATION APPARATUS AND METHOD

CROSS-REFERENCE TO RELATED APPLICATIONS

This application is a national stage entry under 35 U.S.C. § 371 of International Application No. PCT/KR2021/003730 filed on Mar. 25, 2021, which claims priority from Korean Patent Application No. 10-2020-0036394, filed on Mar. 25, 2020, the disclosures of which are incorporated by reference herein.

TECHNICAL FIELD

The present invention relates to cell preparation apparatus and method, and more particularly, to cell preparation apparatus and method which may prevent a displacement of an electrode from its original position when the electrode and a separator sheet are stacked in a Z-folding form.

BACKGROUND ART

In general, types of secondary batteries include a nickel cadmium battery, a nickel hydride battery, a lithium ion battery, and a lithium ion polymer battery. These secondary batteries are not only applied and used in small products such as digital cameras, P-DVDs, MP3Ps, mobile phones, PDAs, portable game devices, power tools, and E-bikes, but are also applied and used in large products requiring high output, such as electric vehicles and hybrid vehicles, and a power storage device and a power storage device for backup which store surplus generated power or renewable energy.

In order to prepare such a secondary battery, first, a positive electrode collector and a negative electrode collector are respectively coated with electrode active material slurries to prepare a positive electrode and a negative electrode, and the positive electrode and the negative electrode are then stacked on opposite sides of a separator to form an electrode assembly having a predetermined shape. Then, after the electrode assembly is accommodated in a battery case and an electrolyte solution is injected, the battery case is sealed.

The electrode assembly is classified into various types. For example, there are a simple stack type in which a unit cell is not prepared and positive electrodes, separators, and negative electrodes are simply crossed and continuously stacked, a lamination & stack type (L&S) in which a unit cell is first prepared using a positive electrode, a separator, and a negative electrode and these unit cells are then stacked, a stack & folding type (S&F) in which a plurality of electrodes or unit cells are spaced apart and attached to one surface of a separator sheet having a greater length in one side and the separator sheet is repeatedly folded in the same direction from one end, and a Z-folding type that alternatingly repeats a process in which a plurality of electrodes or unit cells are alternatingly attached to one surface and the other surface of a separator sheet having a greater length in one side and the separator sheet is folded in a specific direction from one end and then folded in an opposite direction. Among them, the Z-folding type has been frequently used in recent years due to a high alignment degree and a high impregnation degree of the electrolyte solution.

However, typically, since a separate laminating process was not performed after stacking the electrode and the separator sheet in such a Z-folding form, the electrode and the separator sheet were not adhered to each other, and thus, there was a problem in that the electrode was out of position. In order to solve this problem, a separate laminating process was performed after stacking the electrode and the separator sheet, but, since an overall thickness of a stack, in which the electrode and the separator sheet were stacked, was increased, heat was not transferred to the inside of the stack, and thus, there was a problem in that adhesion was reduced. Also, there was also a problem in that the electrode was out of position in a process of transferring the stack to perform the separate laminating process.

[Prior Art Documents] Korean Patent Application Laid-Open Publication No. 2010-0016619

DISCLOSURE OF THE INVENTION

Technical Problem

An aspect of the present invention provides cell preparation apparatus and method which may prevent a displacement of an electrode from its original position when the electrode and a separator sheet are stacked in a Z-folding form.

The object of the present invention is not limited to the aforesaid, but other objects not described herein will be clearly understood by those skilled in the art from descriptions below.

Technical Solution

According to an aspect of the present invention, there is provided an apparatus for preparing a cell which includes: an electrode reel from which an electrode sheet, which is to be a plurality of electrodes, is unwound; a separator reel from which a separator sheet, which is stacked with the electrode while covering the electrode by being folded when the electrode is stably placed, is unwound; a table having an upper surface on which the electrode and the separator sheet are stably placed; and a nozzle for applying an adhesive to at least a portion of a region of the separator sheet stably placed on the table.

Also, the electrode reel may include a first electrode reel from which a first electrode sheet, which is to be a plurality of first electrodes, is unwound; and a second electrode reel from which a second electrode sheet, which is to be a plurality of second electrodes, is unwound.

Furthermore, the nozzle may include a first nozzle for applying the adhesive to at least a portion of a first region of the separator sheet which covers the second electrode; and a second nozzle for applying the adhesive to at least a portion of a second region of the separator sheet which covers the first electrode.

Also, the first nozzle and the second nozzle may be disposed at opposite sides with the separator sheet disposed therebetween.

Furthermore, the first electrode may be stably placed in the first region of the separator sheet, and the second electrode may be stably placed in the second region of the separator sheet.

Also, the apparatus for preparing a cell may further include a first header which sucks the first electrode to stably place the first electrode in the first region; and a second header which sucks the second electrode to stably place the second electrode in the second region.

Furthermore, the apparatus for preparing a cell may further include a moving box which accommodates the separator sheet, the first nozzle, and the second nozzle therein.

Also, the table may linearly reciprocate in a direction in which the separator sheet covers the first electrode and the second electrode.

Furthermore, the table may swing back and forth in a direction in which the separator sheet covers the first electrode and the second electrode.

Also, when the first electrode is stably placed on the separator sheet, one side of the separator sheet may be folded to cover the first electrode, and, when the second electrode is stably placed on the separator sheet, the other side of the separator sheet may be folded to cover the second electrode.

According to another aspect of the present invention, there is provided a method of preparing a cell which includes: cutting a first electrode sheet unwound from a first electrode reel to form a plurality of first electrodes; stably placing a separator sheet unwound from a separator reel on a table; applying an adhesive by a first nozzle to at least a portion of a first region of the separator sheet; stably placing the first electrode in the first region to which the adhesive has been applied; and covering the first electrode with a second region of the separator sheet by folding the separator sheet.

Also, after the covering of the first electrode, the method may further include cutting a second electrode sheet unwound from a second electrode reel to form a plurality of second electrodes; applying an adhesive by a second nozzle to at least a portion of the second region; stably placing the second electrode in the second region to which the adhesive has been applied; and covering the second electrode with the first region of the separator sheet by folding the separator sheet.

Furthermore, in the covering of the first electrode and the covering of the second electrode, the table may linearly reciprocate in a direction in which the separator sheet covers the first electrode and the second electrode.

Also, in the covering of the first electrode and the covering of the second electrode, the table may swing back and forth in a direction in which the separator sheet covers the first electrode and the second electrode.

Furthermore, in the covering of the first electrode and the covering of the second electrode, a moving box, which accommodates the separator sheet, the first nozzle, and the second nozzle therein, may linearly reciprocate in a direction in which the separator sheet covers the first electrode and the second electrode.

Other specific details of the present invention are included in the detailed description and drawings.

Advantageous Effects

According to the embodiments of the present invention, at least the following effects may be achieved.

When stacking an electrode and a separator sheet in a Z-folding form, a displacement of the electrode from its original position may be prevented by applying an adhesive in advance whenever the electrode is stably placed on the separator sheet.

The effects according to the present invention are not limited to the contents as exemplified above, but more various effects are included in the specification.

DETAILED DESCRIPTION

Figure 1:
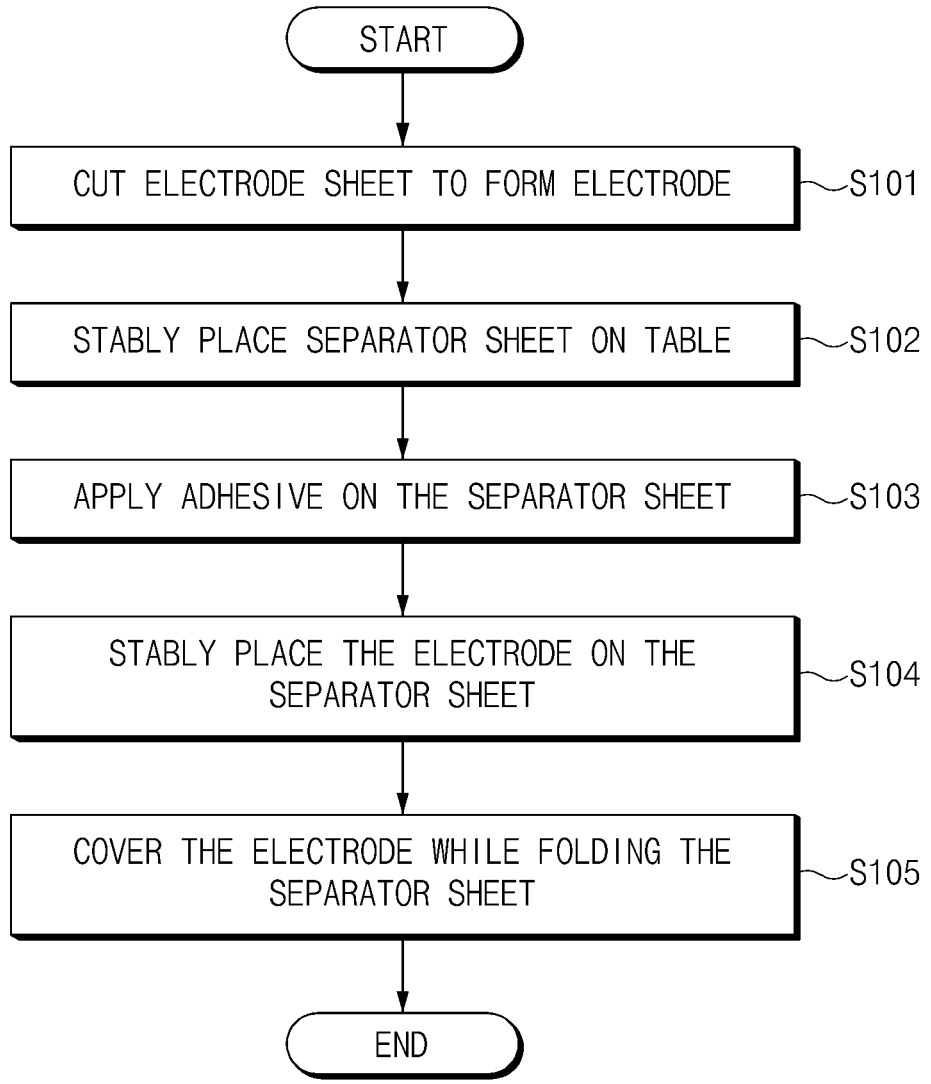
FIG. 1 is a flowchart of a method of preparing a cell according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Further, the present invention is only defined by scopes of claims. Like reference numerals refer to like elements throughout.

Unless defined otherwise, all terms (including technical and scientific terms) used herein may be intended to have meanings understood by those skilled in the art. In addition, terms defined in general dictionaries should not be interpreted abnormally or exaggeratedly, unless clearly specifically defined.

The terminology used herein is for the purpose of describing particular example embodiments only and is not intended to be limiting of the present invention. In the specification, the terms of a singular form may include plural forms unless referred to the contrary. It will be further understood that the terms "comprises" and/or "comprising" when used in this specification, specify the presence of stated components, but do not preclude the presence or addition of one or more other components.

Hereinafter, preferred embodiments of the present invention will be described in detail with reference to the accompanying drawings.

FIG. 1 is a flowchart of a method of preparing a cell according to an embodiment of the present invention.

According to an embodiment of the present invention, when stacking an electrode 11 and a separator sheet 122 in a Z-folding form, a displacement of the electrode 11 from its original position may be prevented by applying an adhesive in advance whenever the electrode 11 is stably placed on the separator sheet 122.

For this purpose, the method of preparing a unit cell according to the embodiment of the present invention includes the steps of: cutting a first electrode sheet 1111 unwound from a first electrode reel 111 to form a plurality of first electrodes 1112; stably placing a separator sheet 122 unwound from a separator reel 121 on a table 16; applying an adhesive by a first nozzle 171 to at least a portion of a first region 1221 of the separator sheet 122; stably placing the first electrode 1112 in the first region 1221 to which the adhesive has been applied; and covering the first electrode 1112 with a second region 1222 of the separator sheet 122 by folding the separator sheet 122.

Hereinafter, each step illustrated in the flowchart of FIG. 1 will be described in detail with reference to FIGS. 2 and 13.

Figure 2:
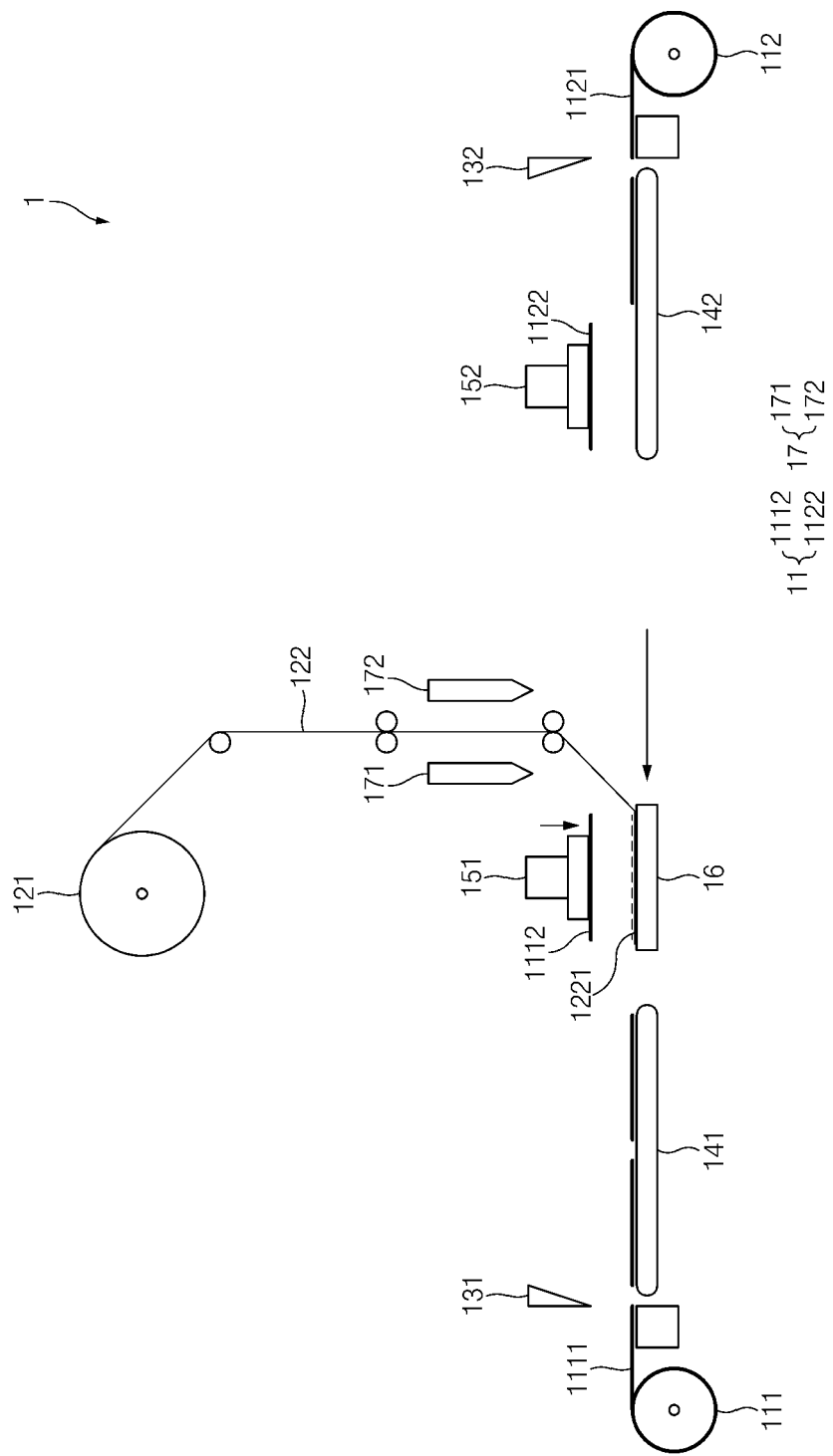
FIG. 2 is a schematic view illustrating a state in which a first electrode is stably placed in a first region of a separator sheet in an apparatus for preparing a cell according to an embodiment of the present invention.

FIG. 2 is a schematic view illustrating a state in which the first electrode 112 is stably placed in the first region 1221 of the separator sheet 112 in an apparatus 1 for preparing a cell according to an embodiment of the present invention.

As illustrated in FIG. 2, the apparatus 1 for preparing a unit cell according to the embodiment of the present invention may include an electrode reel from which an electrode sheet, which is to be a plurality of electrodes 11, is unwound; a separator reel 121 from which a separator sheet 122, which is stacked with the electrode 11 while covering the electrode 11 by being folded when the electrode 11 is stably placed, is unwound; a table 16 having an upper surface on which the electrode 11 and the separator sheet 122 are stably placed; and a nozzle 17 for applying an adhesive to at least a portion of a region of the separator sheet 122 stably placed on the table 16. In addition, the electrode reel may include a first electrode reel 111 from which a first electrode sheet 1111, which is to be a plurality of first electrodes 1112, is unwound; and a second electrode reel 112 from which a second electrode sheet 1121, which is to be a plurality of second electrodes 1122, is unwound, and the nozzle 17 may include a first nozzle 171 for applying the adhesive to at least a portion of a first region 1221 of the separator sheet 122 which covers the second electrode 1122; and a second nozzle 172 for applying the adhesive to at least a portion of a second region 1222 of the separator sheet 122 which covers the first electrode 1112.

The electrode reel 111 is a reel on which the electrode sheet is wound, and the electrode sheet is unwound from the electrode reel. Then, the electrode sheet is cut to form the electrode 11. The electrode sheet may be prepared by coating a slurry of an electrode active material, a conductive agent, and a binder on an electrode collector, drying, and then pressing the coated electrode collector.

According to an embodiment of the present invention, the electrode reel includes the first electrode reel 111 and the second electrode reel 112. The first electrode reel 111 is a reel on which the first electrode sheet 1111 is wound, and the first electrode sheet 1111 is unwound from the first electrode reel 111. In addition, the second electrode reel 112 is a reel on which the second electrode sheet 1121 is wound, and the second electrode sheet 1121 is unwound from the second electrode reel 112. Herein, the first electrode 1112 and the second electrode 1122 may be electrodes 11 having different polarities. That is, if the first electrode 1112 is a positive electrode, the second electrode 1122 may be a negative electrode, and, if the first electrode 1112 is a negative electrode, the second electrode 1122 may be a positive electrode.

The separator reel 121 is a reel on which the separator sheet 122 is wound, and the separator sheet 122 is unwound from the separator reel 121. Then, the separator sheet 122 is stacked with the electrode 11 which is formed by cutting the electrode sheet. The electrode 11 and the separator sheet 122 are stacked in a Z-folding form. Particularly, according to an embodiment of the present invention, when the first electrode 1112 is stably placed on the separator sheet 122, one side of the separator sheet 122 is folded to cover the first electrode 1112, and, when the second electrode 1122 is stably placed on the separator sheet 122, the other side thereof is folded to cover the second electrode 1122.

The table 16 is a place where a cell is prepared by stably placing and stacking the electrode 11 and the separator sheet 122 on an upper surface thereof. It is desirable that the upper surface of the table 16 is formed substantially flat so that the cell may be stably prepared. The table 16 may be disposed between the first electrode reel 111 and the second electrode reel 112. Then, when the first electrode sheet 1111 unwound from the first electrode reel 111 is cut to form the first electrode 1112, a first transfer device 141 transfers the first electrode 1112 toward the table 16. Also, when the second electrode sheet 1121 unwound from the second electrode reel 112 is cut to form the second electrode 1122, a second transfer device 142 transfers the second electrode 1122 toward the table 16. That is, since the first electrode 1112 and the second electrode 1122 are respectively transferred from opposite sides of the table 16, it may be easy to alternatingly stack the first electrode 1112 and the second electrode 1122 on the separator sheet 122.

According to an embodiment of the present invention, the table 16 may linearly reciprocate in a direction in which the separator sheet 122 covers the first electrode 1112 and the second electrode 1122. That is, if the electrode 11 is stacked on the separator sheet 122 whenever the table 16 linearly reciprocates toward the first transfer device 141 and the second transfer device 142, the separator sheet 122 may cover the electrode 11.

The nozzle 17 applies an adhesive to the separator sheet 122. In this case, if the separator sheet 122 is folded in a direction of covering the electrode 11, the nozzle 17 may apply the adhesive to an upper surface of a region of the separator sheet 122 which covers the electrode 11.

It is desirable that the adhesive is uniformly applied to the region of the separator sheet 122. However, if the adhesive is applied to an entire surface of the region of the separator sheet 122, an amount of the adhesive applied may be excessively large. Accordingly, the adhesive may flow to the outside of the separator sheet 122 to contaminate other parts, and a function of generating power may not be smooth when a secondary battery is prepared. Thus, the adhesive may be applied to the upper surface of the region of the separator sheet 122 by a spot application method of applying the adhesive in the form of a dot or a line application method of applying the adhesive in the form of a line.

In contrast, if the amount of the adhesive applied is excessively small, the electrode 11 is still not fixed to the separator sheet 122 while the cell is moved, and the electrode 11 may be out of position. Thus, it is desirable that a spacing between regions to which the adhesive is applied is not excessively large.

The adhesive must maintain adhesiveness even if a separator is impregnated with an electrolyte solution. Thus, it is desirable that the adhesive has a property of corrosion resistance that is not modified by chemical causes. Such an adhesive is a hot melt adhesive, wherein the adhesive may include a modified olefin-based thermoplastic resin.

The nozzle 17 includes the first nozzle 171 for applying the adhesive to at least a portion of the first region 1221 of the separator sheet 122 which covers the second electrode 1122; and the second nozzle 172 for applying the adhesive to at least a portion of the second region 1222 of the separator sheet 122 which covers the first electrode 1112. In addition, the first nozzle 171 and the second nozzle 172 are disposed at opposite sides with the separator sheet 122 disposed therebetween. Thus, among the first nozzle 171 and the second nozzle 172, the nozzle 17 located above a region where the separator sheet 122 covers the electrode 11 may apply the adhesive to the region. Specifically, if the second region 1222 covers the first electrode 1112, the second nozzle 172 located above the second region 1222 applies the adhesive to the second region 1222, and, if the first region 1221 covers the second electrode 1122, the first nozzle 171 located above the first region 1221 applies the adhesive to the first region 1221.

The plurality of first electrodes 1112 and the plurality of second electrodes 1122 are alternatingly attached to one surface of the separator sheet 122 and the other surface thereof, respectively. The first region 1221 refers to a region on one surface of the separator sheet 122 to which the first electrode 1112 is attached while covering the second electrode 1122. In addition, the second region 1222 refers to a region on the other surface of the separator sheet 122 to which the second electrode 1122 is attached while covering the first electrode 1112.

However, the present invention is not limited thereto, and the nozzle 17 located above the electrode 11 may apply an adhesive to the electrode 11 before the separator sheet 122 covers the electrode 11. Specifically, before the second region 1222 covers the first electrode 1112, the first nozzle 171 located above the first electrode 1112 may apply an adhesive to the first electrode 1112, and, before the first region 1221 covers the second electrode 1122, the second nozzle 172 located above the second electrode 1122 may also apply an adhesive to the second electrode 1122.

The method of preparing a unit cell according to the embodiment of the present invention may be performed as follows, using the apparatus 1 for preparing a unit cell as described above.

When the first electrode sheet 1111 is first unwound from the first electrode reel 111, a first cutter 131 cuts the first electrode sheet 1111 (S101). Then, the plurality of first electrodes 1112 are formed. When the first transfer device 141 transfers the first electrode 1112, a first header 151 sucks the first electrode 1112.

When the separator sheet 122 is unwound from the separator reel 121, the separator sheet 122 is stably placed on the upper surface of the table 16 (S102). When the table 16 linearly moves toward the first transfer device 141 that transfers the first electrode 1112, the first nozzle 171 applies an adhesive to at least a portion of the first region 1221 of the separator sheet 122 stably placed on the table 16 (S103).

When the table 16 linearly moves toward the first transfer device 141, the first header 151 having the first electrode 1112 adsorbed thereon may also linearly move toward the table 16. In addition, when the first header 151 is located above the table 16, as illustrated in FIG. 2, the first header 151 stably places the electrode 1112 in the first region 1221 of the separator sheet 122 to which the adhesive has been applied (S104).

Figure 3:
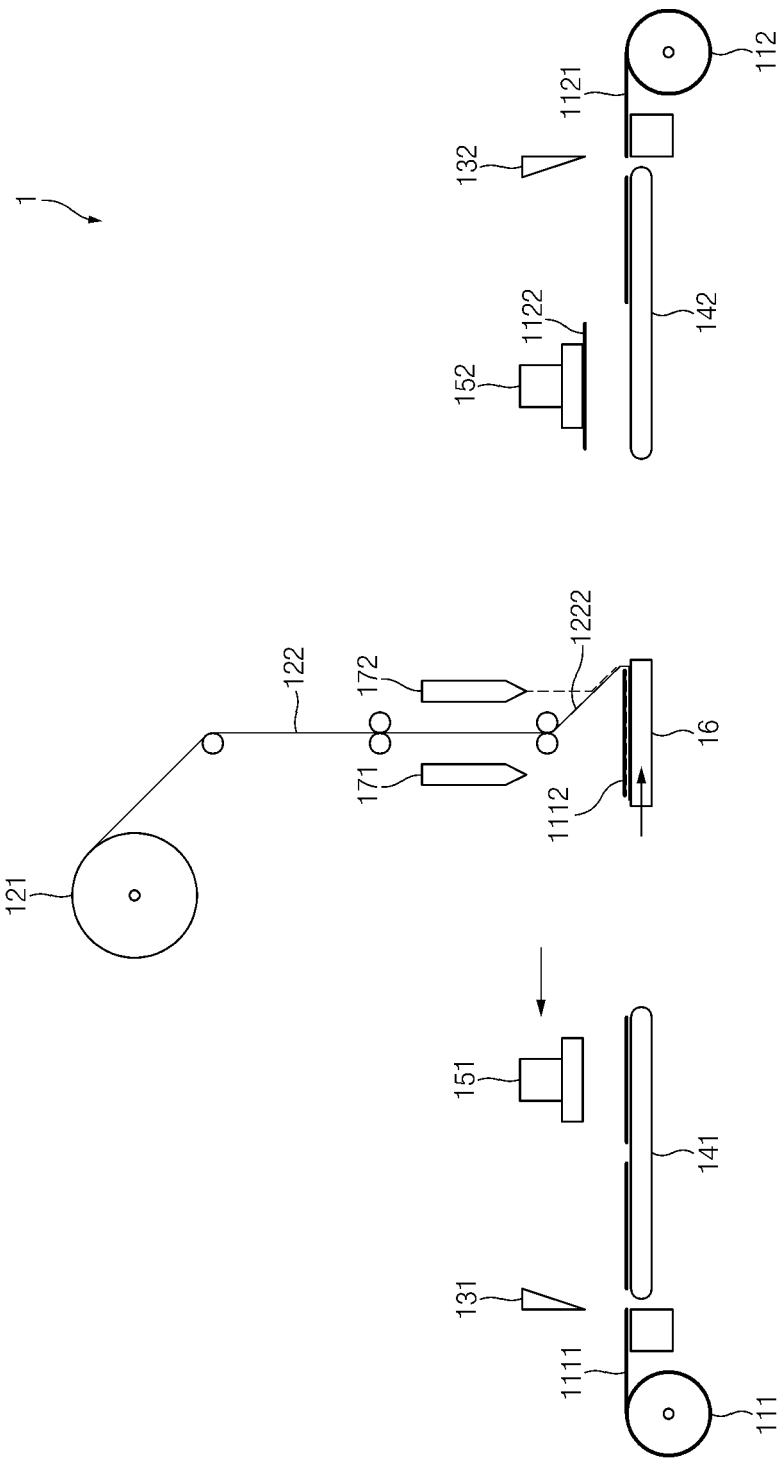
FIG. 3 is a schematic view illustrating a state in which a table linearly moves and a second nozzle applies an adhesive to a second region of the separator sheet in the apparatus for preparing a cell according to the embodiment of the present invention.

FIG. 3 is a schematic view illustrating a state in which the table 16 linearly moves and the second nozzle 172 applies an adhesive to the second region 1222 of the separator sheet 122 in the apparatus 1 for preparing a cell according to the embodiment of the present invention.

The first electrode 1112 is stably placed in the first region 1221, and, as illustrated in FIG. 3, the table 16 linearly moves toward the second transfer device 142 that transfers the second electrode 1122. Then, one side of the separator sheet 122 is folded so that the second region 1222 of the separator sheet 122 covers the first electrode 1112 (S105).

When the second electrode sheet 1121 is unwound from the second electrode reel 112, a second cutter 132 cuts the second electrode sheet 1121. Then, a plurality of second electrodes 1122 are formed. When the second transfer device 142 transfers the second electrode 1122, a second header 152 sucks the second electrode 1122. When the second region 1222 covers the first electrode 1112, the second nozzle 172 located above the second region 1222 applies an adhesive to at least a portion of the second regions 1222 of the separator sheet 122.

Figure 4:
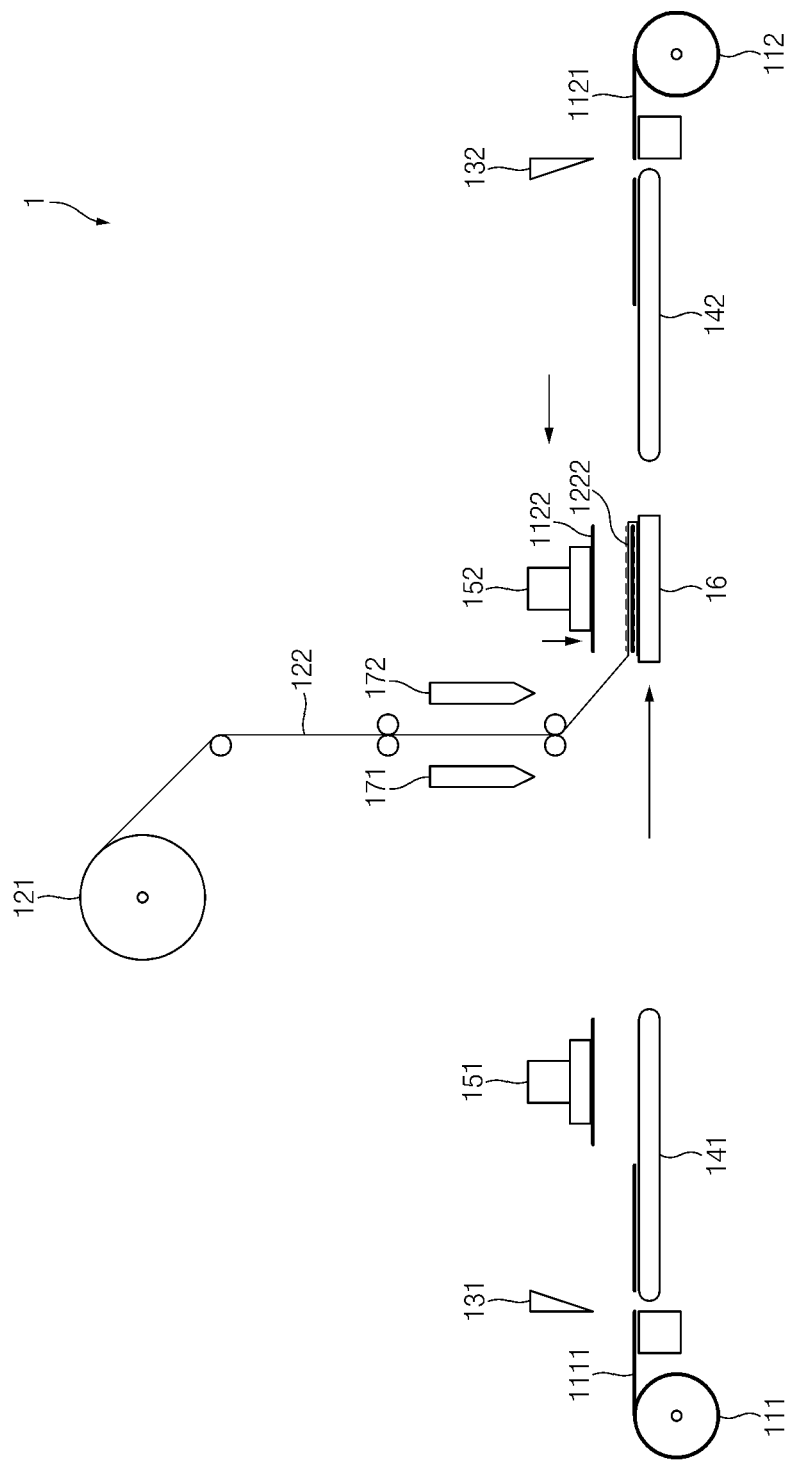
FIG. 4 is a schematic view illustrating a state in which a second electrode is stably placed in the second region of the separator sheet in the apparatus for preparing a cell according to the embodiment of the present invention.

FIG. 4 is a schematic view illustrating a state in which the second electrode 1122 is stably placed in the second region 1222 of the separator sheet 122 in the apparatus 1 for preparing a cell according to the embodiment of the present invention.

When the table 16 linearly moves toward the second transfer device 142, the second header 152 having the second electrode 1122 sucked thereon may also linearly move toward the table 16. In addition, when the second header 152 is located above the table 16, as illustrated in FIG. 4, the second header 152 stably places the second electrode 1122 in the second region 1222 of the separator sheet 122 to which the adhesive has been applied.

Figure 5:
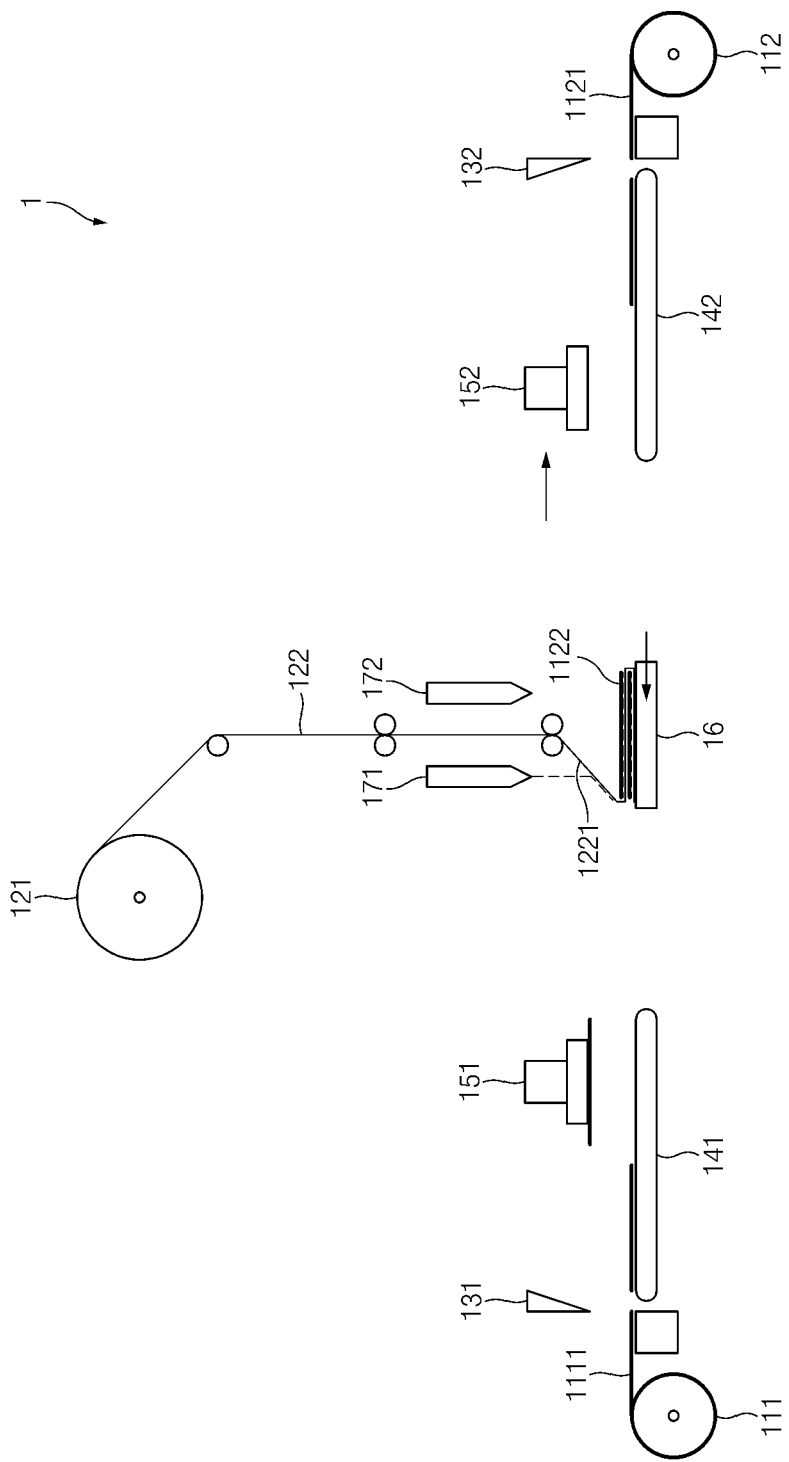
FIG. 5 is a schematic view illustrating a state in which the table linearly moves and a first nozzle applies an adhesive to the first region of the separator sheet in the apparatus for preparing a cell according to the embodiment of the present invention.

FIG. 5 is a schematic view illustrating a state in which the table 16 linearly moves and the first nozzle 171 applies an adhesive to the first region 1221 of the separator sheet 122 in the apparatus 1 for preparing a cell according to the embodiment of the present invention.

The second electrode 1122 is stably placed in the second region 1222, and, as illustrated in FIG. 5, the table 16 again linearly moves toward the first transfer device 141. Then, the other side of the separator sheet 122 is folded so that the first region 1221 of the separator sheet 122 covers the second electrode 1122. When the first region 1221 covers the second electrode 1122, the first nozzle 171 located above the first region 1221 applies an adhesive to at least a portion of the first regions 1221 of the separator sheet 122.

That is, the method of preparing a cell according to the embodiment of the present invention may be performed by repeating the above-described processes.

Figure 6:
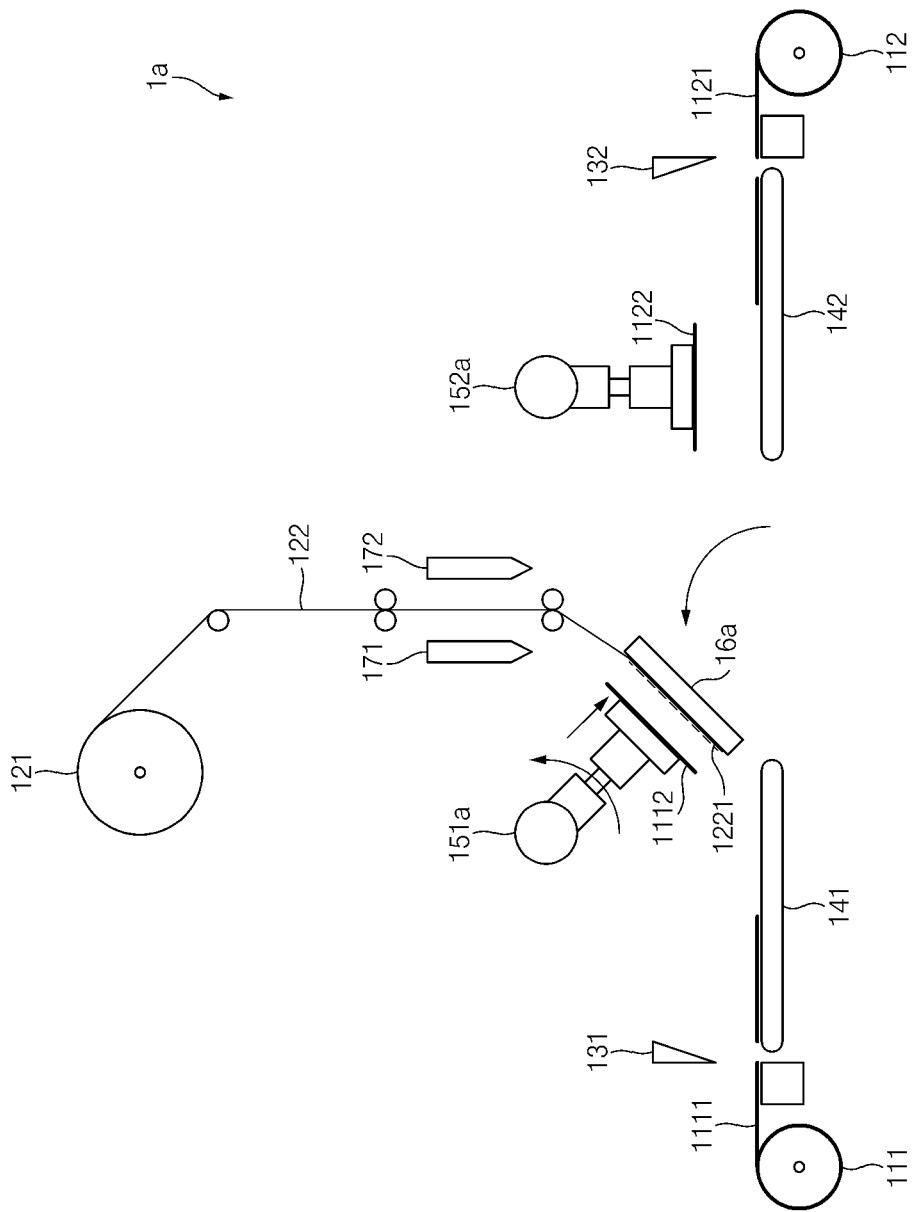
FIG. 6 is a schematic view illustrating a state in which a first electrode is stably placed in a first region of a separator sheet in an apparatus for preparing a cell according to another embodiment of the present invention.

FIG. 6 is a schematic view illustrating a state in which the first electrode 1112 is stably placed in the first region 1221 of the separator sheet 122 in an apparatus 1*a* for preparing a cell according to another embodiment of the present invention.

According to another embodiment of the present invention, a table 16*a* may swing back and forth in a direction in which the separator sheet 122 covers the first electrode 1112 and the second electrode 1122. Then, accordingly, a first header 151*a* and a second header 152*a* may not linearly move, but may swing.

A method of preparing a unit cell according to another embodiment of the present invention may be performed as follows, using the apparatus 1*a* for preparing a unit cell as described above.

When the first cutter 131 cuts the first electrode sheet 1111, a plurality of first electrodes 1112 are formed (S101). The first header 151*a* sucks the first electrode 1112 transferred to the first transfer device 141.

When the separator sheet 122 is stably placed on an upper surface of the table 16*a* (S102) and the table 16*a* swings toward the first transfer device 141, the first nozzle 171 applies an adhesive to at least a portion of the first region 1221 of the separator sheet 122 (S103).

When the table 16*a* swings toward the first transfer device 141, the first header 151*a* having the first electrode 1112 sucked thereon may also swing toward the table 16*a*. In addition, when the upper surface of the table 16*a* and the first header 151*a* are positioned to face each other, as illustrated in FIG. 6, the first header 151*a* stably places the first electrode 1112 in the first region 1221 of the separator sheet 122 to which the adhesive has been applied (S104).

Figure 7:
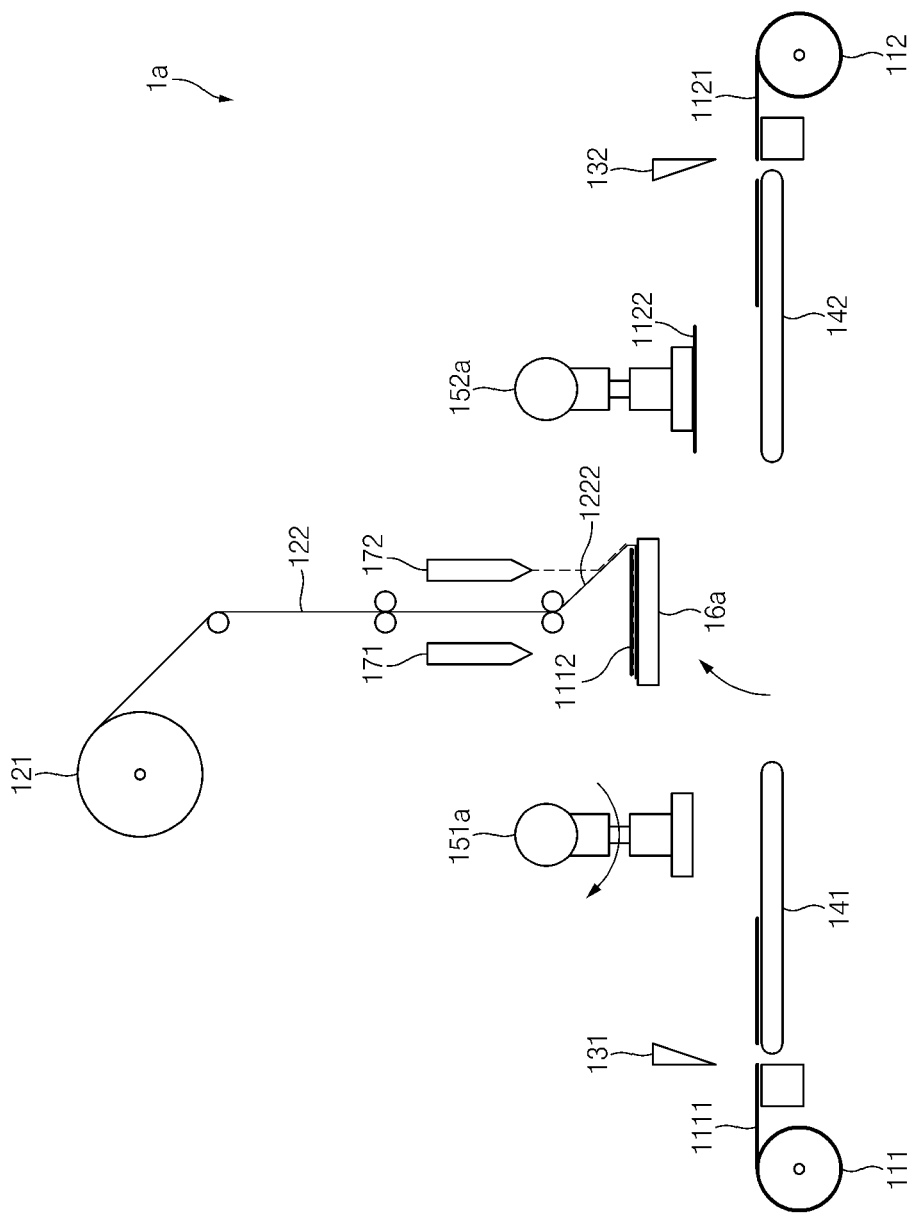
FIG. 7 is a schematic view illustrating a state in which a table swings and a second nozzle applies an adhesive to a second region of the separator sheet in the apparatus for preparing a cell according to the another embodiment of the present invention.

FIG. 7 is a schematic view illustrating a state in which the table 16*a* swings and the second nozzle 172 applies an adhesive to the second region 1222 of the separator sheet 122 in the apparatus 1*a* for preparing a cell according to the another embodiment of the present invention.

When the first electrode 1112 is stably placed in the first region 1221 and, as illustrated in FIG. 7, the table 16*a* swings toward the second transfer device 142, the second region 1222 of the separator sheet 122 covers the first electrode 1112 (S105).

When the second cutter 132 cuts the second electrode sheet 1121, a plurality of second electrodes 1122 are formed. The second header 152*a* sucks the second electrode 1122 transferred to the second transfer device 142. The second nozzle 172 located above the second region 1222 applies an adhesive to at least a portion of the second region 1222 of the separator sheet 122.

Figure 8:
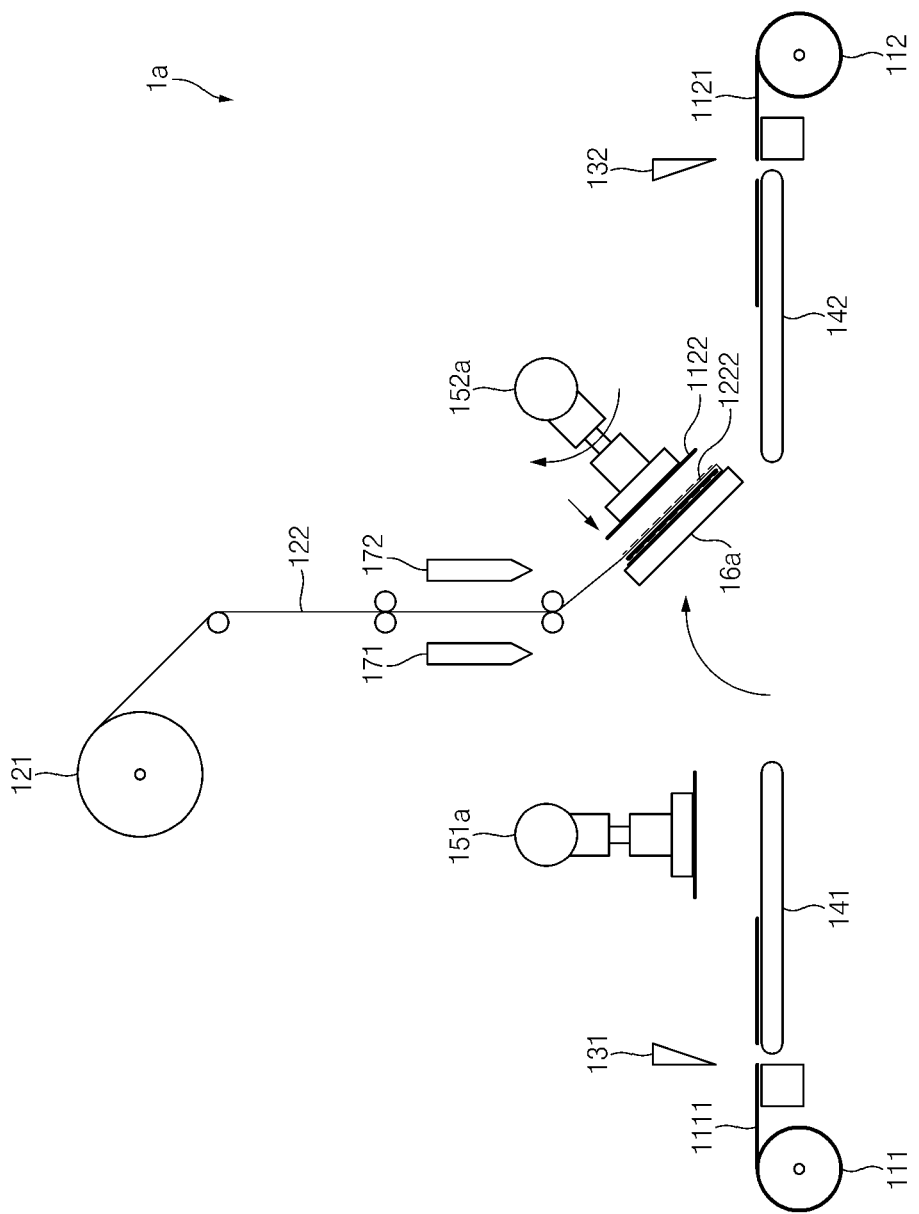
FIG. 8 is a schematic view illustrating a state in which a second electrode is stably placed in the second region of the separator sheet in the apparatus for preparing a cell according to the another embodiment of the present invention.

FIG. 8 is a schematic view illustrating a state in which the second electrode 1122 is stably placed in the second region 1222 of the separator sheet 122 in the apparatus 1*a* for preparing a cell according to the another embodiment of the present invention.

When the table 16*a* swings toward the second transfer device 142, the second header 152*a* having the second electrode 1122 sucked thereon may also swing toward the table 16*a*. In addition, when the upper surface of the table 16*a* and the second header 152*a* are positioned to face each other, as illustrated in FIG. 8, the second header 152*a* stably places the second electrode 1122 in the second region 1222 of the separator sheet 122 to which the adhesive has been applied.

Figure 9:
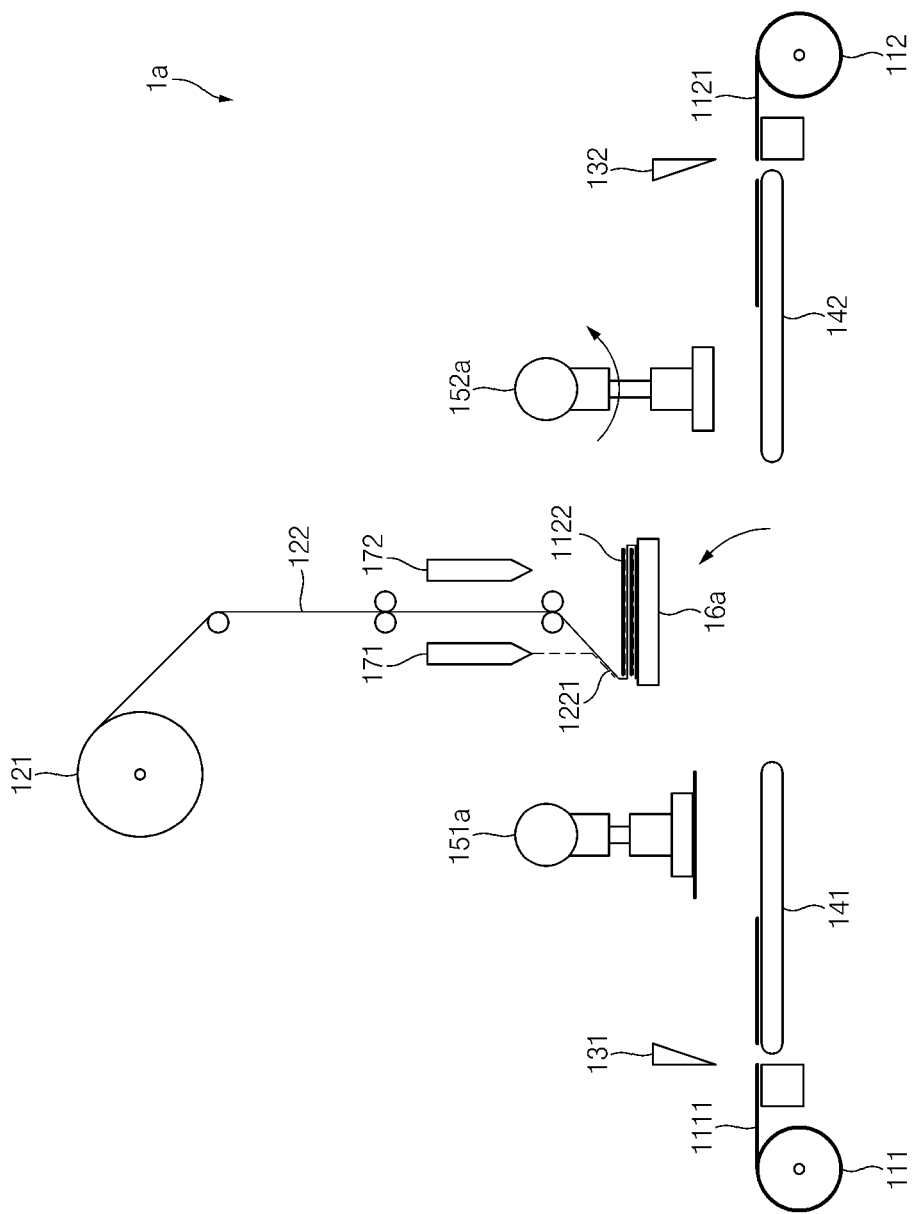
FIG. 9 is a schematic view illustrating a state in which the table swings and a first nozzle applies an adhesive to the first region of the separator sheet in the apparatus for preparing a cell according to the another embodiment of the present invention.

FIG. 9 is a schematic view illustrating a state in which the table 16*a* swings and the first nozzle 171 applies an adhesive to the first region 1221 of the separator sheet 122 in the apparatus 1*a* for preparing a cell according to the another embodiment of the present invention.

When the second electrode 1122 is stably placed in the second region 1222 and, as illustrated in FIG. 9, the table 16*a* again swings toward the first transfer device 141, the first region 1221 of the separator sheet 122 covers the second electrode 1122. The first nozzle 171 located above the first region 1221 applies an adhesive to at least a portion of the first region 1221 of the separator sheet 122.

That is, the method of preparing a cell according to the another embodiment of the present invention may be performed by repeating the above-described processes.

Figure 10:
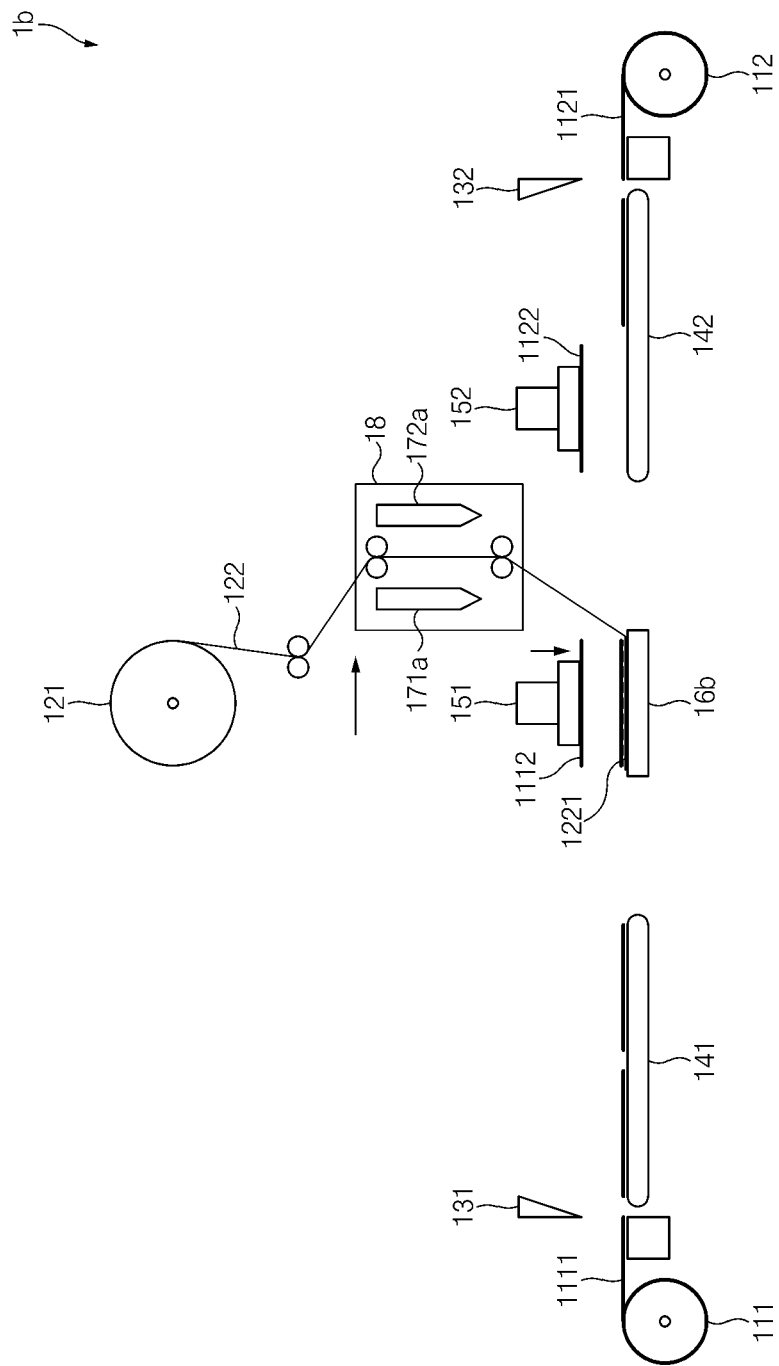
FIG. 10 is a schematic view illustrating a state in which a first electrode is stably placed in a first region of a separator sheet in an apparatus for preparing a cell according to another embodiment of the present invention.

FIG. 10 is a schematic view illustrating a state in which the first electrode 1112 is stably placed in the first region 1221 of the separator sheet 122 in an apparatus 1*b* for preparing a cell according to another embodiment of the present invention.

According to another embodiment of the present invention, a table 16*b* does not move, but is fixed. In addition, a moving box 18 accommodating the separator sheet 122, a first nozzle 171*a*, and a second nozzle 172*a* therein may linearly reciprocate in a direction in which the separator sheet 122 covers the first electrode 1112 and the second electrode 1122. Then, accordingly, the first header 151 and the second header 152 may also linearly move.

A method of preparing a unit cell according to another embodiment of the present invention may be performed as follows, using the apparatus 1*b* for preparing a unit cell as described above.

When the first cutter 131 cuts the first electrode sheet 1111, a plurality of first electrodes 1112 are formed (S101). The first header 151 sucks the first electrode 1112 transferred to the first transfer device 141.

When the separator sheet 122 is stably placed on an upper surface of the table 16*b* (S102) and the moving box 18 linearly moves toward the second transfer device 142, the first nozzle 171*a* applies an adhesive to at least a portion of the first region 1221 of the separator sheet 122 (S103).

When the moving box 18 linearly moves toward the second transfer device 142, the first header 151 having the first electrode 1112 sucked thereon may also linearly move toward the table 16*b*. In addition, when the first header 151 is located above the table 16*b*, as illustrated in FIG. 10, the first header 151 stably places the first electrode 1112 in the first region 1221 of the separator sheet 122 to which the adhesive has been applied (S104).

Figure 11:
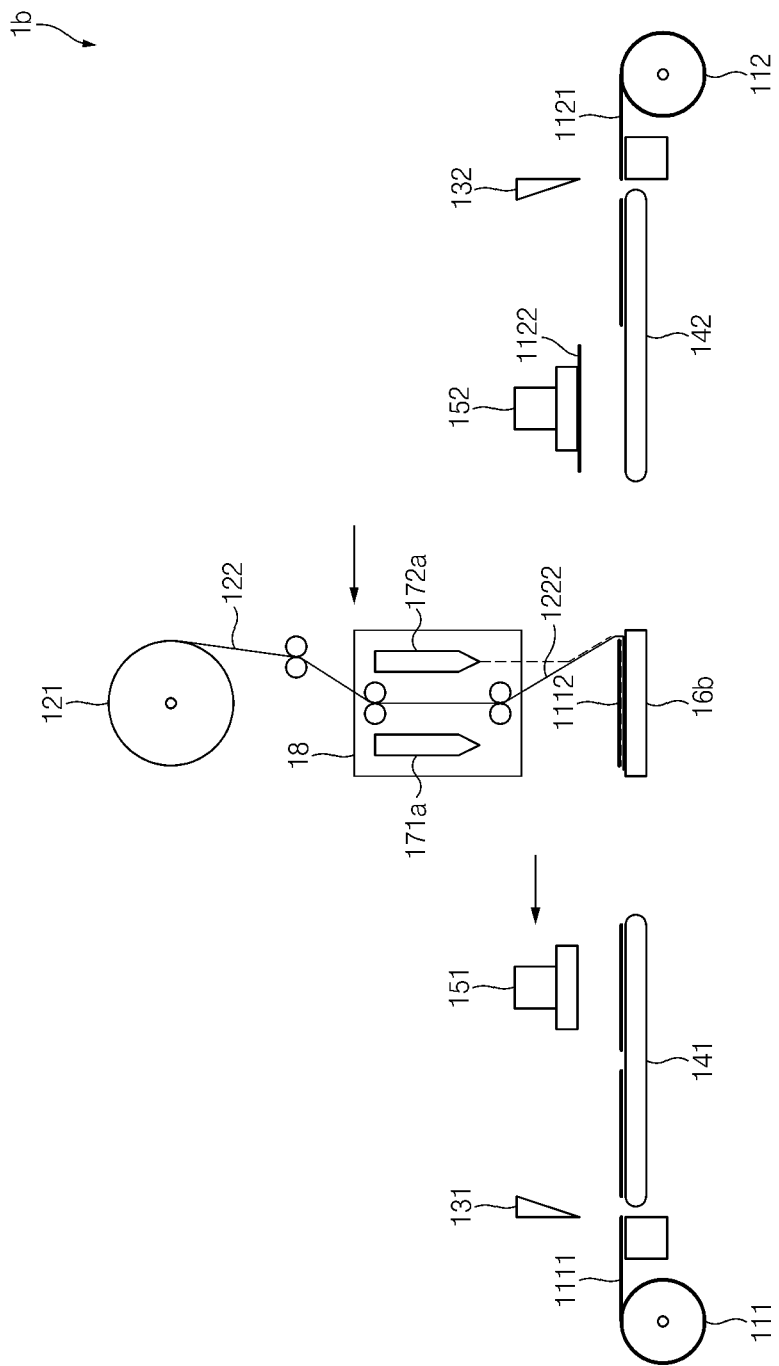
FIG. 11 is a schematic view illustrating a state in which a moving box linearly moves and a second nozzle applies an adhesive to a second region of the separator sheet in the apparatus for preparing a cell according to the another embodiment of the present invention.

FIG. 11 is a schematic view illustrating a state in which the moving box 18 linearly moves and the second nozzle 172*a* applies an adhesive to the second region 1222 of the separator sheet 122 in the apparatus 1*b* for preparing a cell according to the another embodiment of the present invention.

When the first electrode 1112 is stably placed in the first region 1221 and, as illustrated in FIG. 11, the moving box 18 linearly moves toward the first transfer device 141, the second region 1222 of the separator sheet 122 covers the first electrode 1112 (S105).

When the second cutter 132 cuts the second electrode sheet 1121, a plurality of second electrodes 1122 are formed.

The second header 152 sucks the second electrode 1122 transferred to the second transfer device 142. The second nozzle 172a located above the second region 1222 applies an adhesive to at least a portion of the second region 1222 of the separator sheet 122.

Figure 12:
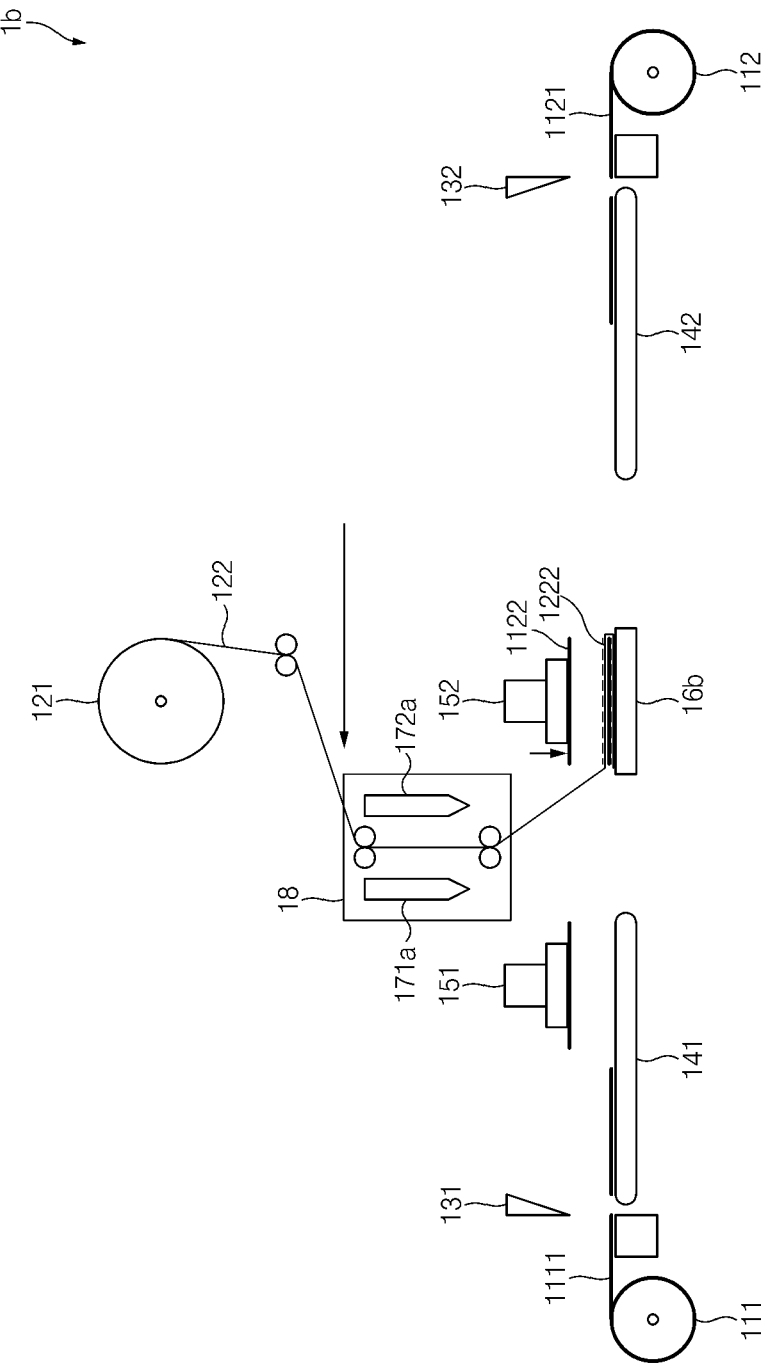
FIG. 12 is a schematic view illustrating a state in which a second electrode is stably placed in the second region of the separator sheet in the apparatus for preparing a cell according to the another embodiment of the present invention.

FIG. 12 is a schematic view illustrating a state in which the second electrode 1122 is stably placed in the second region 1222 of the separator sheet 122 in the apparatus 1b for preparing a cell according to the another embodiment of the present invention.

When the moving box 18 linearly moves toward the first transfer device 141, the second header 152 having the second electrode 1122 sucked thereon may also linearly move toward the table 16b. In addition, when the second header 152 is located above the table 16b, as illustrated in FIG. 12, the second header 152 stably places the second electrode 1122 in the second region 1222 of the separator sheet 122 to which the adhesive has been applied.

Figure 13:
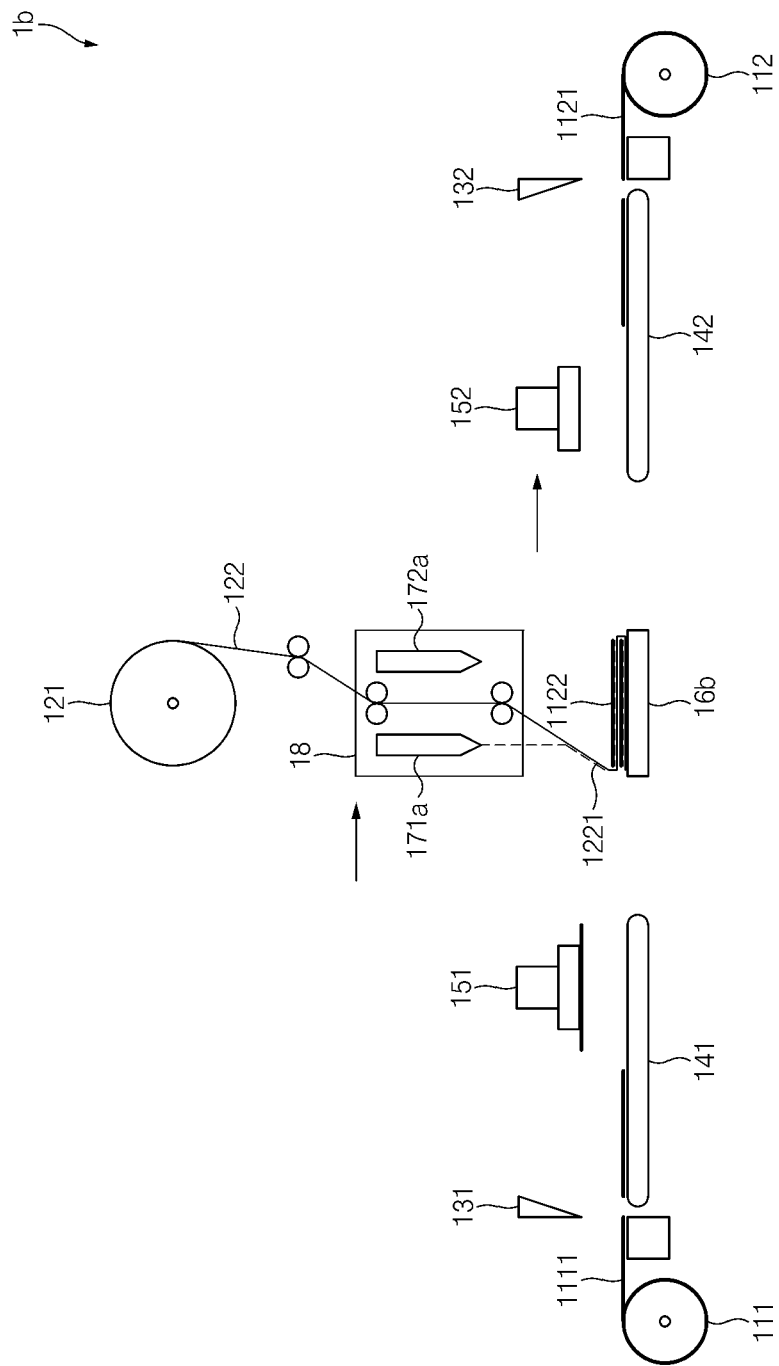
FIG. 13 is a schematic view illustrating a state in which the moving box linearly moves and a first nozzle applies an adhesive to the first region of the separator sheet in the apparatus for preparing a cell according to the another embodiment of the present invention.

FIG. 13 is a schematic view illustrating a state in which the moving box 18 linearly moves and the first nozzle 171a applies an adhesive to the first region 1221 of the separator sheet 122 in the apparatus 1b for preparing a cell according to the another embodiment of the present invention.

When the second electrode 1122 is stably placed in the second region 1222 and, as illustrated in FIG. 13, the moving box 18 again linearly moves toward the second transfer device 142, the first region 1221 of the separator sheet 122 covers the second electrode 1122. The first nozzle 171a located above the first region 1221 applies an adhesive to at least a portion of the first region 1221 of the separator sheet 122.

That is, the method of preparing a cell according to the another embodiment of the present invention may be performed by repeating the above-described processes.

If the methods of preparing a cell according to the embodiments of the present invention are performed, when stacking the electrode 11 and the separator sheet 122 in a Z-folding form, a displacement of the electrode 11 from its original position may be prevented by applying the adhesive in advance whenever the electrode 11 is stably placed on the separator sheet 122.

It will be understood by those of ordinary skill in the art that various changes in form and details may be made therein without departing from the spirit and scope of the invention as defined by the following claims. Accordingly, it is to be understood that the invention has been described by way of illustration and not limitation. Thus, the scope of the invention is defined by the following claims rather than the foregoing detailed description, and it is to be interpreted that all changes or modifications derived from the meaning, scope and equivalent concept of the appended claims are within the scope of the present invention.

DESCRIPTION OF THE REFERENCE NUMERALS

| | |
|---|---|
| 1: Cell Preparation Apparatus | 11: Electrode |
| 16: Table | 17: Nozzle |
| 18: Moving Box | 111: First Electrode Reel |
| 112: Second Electrode Reel | 121: Separator Reel |
| 122: Separator Sheet | 131: First Cutter |
| 132: Second Cutter | 141: First Transfer Device |
| 142: Second Transfer Device | 151: First Header |
| 152: Second Header | 171: First Nozzle |
| 172: Second Nozzle | 1111: First Electrode Sheet |
| 1112: First Electrode | 1121: Second Electrode Sheet |
| 1122: Second Electrode | 1221: First Region |
| 1222: Second Region | |

The invention claimed is:

1. An apparatus for preparing a cell, the apparatus comprising:
   a first electrode reel from which a first electrode sheet is unwound, wherein the first electrode sheet is configured to form a plurality of first electrodes;
   a second electrode reel from which a second electrode sheet is unwound, wherein the second electrode sheet is configured to form a plurality of second electrodes;
   a separator reel from which a separator sheet is unwound, wherein the separator sheet is configured to be stacked with the plurality of first and second electrodes while covering an electrode of the plurality of first and second electrodes by being folded when the respective electrode of the plurality of first and second electrodes is stably placed;
   a table having an upper surface on which the plurality of first and second electrodes and the separator sheet are stably placed;
   a first nozzle configured to apply an adhesive to at least a portion of a first region of the separator sheet which covers a second electrode of the plurality of second electrodes; and
   a second nozzle configured to apply the adhesive to at least a portion of a second region of the separator sheet which covers a first electrode of the plurality of first electrodes,
   wherein the table is configured to repeatedly move between a first position and a second position spaced apart from one another along a horizontal dimension, and the first and second nozzles are positioned above the table along a vertical dimension transverse to the horizontal dimension,
   wherein the first nozzle is configured to apply the adhesive to the portion of the first region of the separator sheet positioned underneath the first nozzle in the vertical dimension, and
   wherein the second nozzle is configured to apply the adhesive to the portion of the second region of the separator sheet positioned underneath the second nozzle in the vertical dimension.

2. The apparatus for preparing the cell of claim 1, wherein the first nozzle and the second nozzle are disposed at opposite sides with the separator sheet disposed therebetween.

3. The apparatus for preparing the cell of claim 1, wherein a first electrode of the plurality of first electrodes is stably placed in the first region of the separator sheet, and
   a second electrode of the plurality of second electrodes is stably placed in the second region of the separator sheet.

4. The apparatus for preparing the cell of claim 3, further comprising:
   a first header configured to suck the first electrode to stably place the first electrode in the first region; and
   a second header configured to suck the second electrode to stably place the second electrode in the second region.

5. The apparatus for preparing the cell of claim 1, further comprising:
 a moving box configured to accommodate the separator sheet, the first nozzle, and the second nozzle therein.

6. The apparatus for preparing the cell of claim 1, wherein the table is configured to linearly reciprocate along the horizontal dimension.

7. The apparatus for preparing the cell of claim 1, wherein the table is configured to swing back and forth along the horizontal dimension.

8. The apparatus for preparing the cell of claim 1, wherein one side of the separator sheet is folded to cover a first electrode of the plurality of first electrodes when the first electrode is stably placed on the separator sheet, and
 the other side of the separator sheet is folded to cover a second electrode of the plurality of second electrodes when the second electrode is stably placed on the separator sheet.

9. A method of preparing a cell, the method comprising:
 cutting a first electrode sheet unwound from a first electrode reel to form a first electrode of a plurality of first electrodes;
 stably placing a separator sheet unwound from a separator reel on a table;
 applying an adhesive by a first nozzle to at least a portion of a first region of the separator sheet;
 stably placing the first electrode in the first region to which the adhesive has been applied; and
 covering the first electrode with a second region of the separator sheet by folding the separator sheet;
 after the covering of the first electrode, cutting a second electrode sheet unwound from a second electrode reel to form a second electrode of a plurality of second electrodes;
 applying the adhesive by a second nozzle to at least a portion of the second region; stably placing the second electrode in the second region to which the adhesive has been applied; and
 covering the second electrode with the first region of the separator sheet by folding the separator sheet,
 wherein the table is configured to repeatedly move between a first position and a second position spaced apart from one another along a horizontal dimension, and the first and second nozzles are positioned above the table along a vertical dimension transverse to the horizontal dimension,
 wherein the first nozzle is configured to apply the adhesive to the portion of the first region of the separator sheet positioned underneath the first nozzle in the vertical dimension, and
 wherein the second nozzle is configured to apply the adhesive to the portion of the second region of the separator sheet positioned underneath the second nozzle in the vertical dimension.

10. The method of claim 9, wherein the covering of the first electrode and the covering of the second electrode comprises
 the table configured to linearly reciprocate along the horizontal dimension.

11. The method of claim 9, wherein the covering of the first electrode and the covering of the second electrode comprises
 the table configured to swing back and forth along the horizontal dimension.

12. The method of claim 9, wherein the covering of the first electrode and the covering of the second electrode comprises
 a moving box configured to accommodate the separator sheet, the first nozzle, and the second nozzle therein, the moving box configured to linearly reciprocate in a direction in which the separator sheet covers the first electrode and the second electrode.

* * * * *